United States Patent
Rotkop et al.

(10) Patent No.: US 11,553,002 B2
(45) Date of Patent: Jan. 10, 2023

(54) CLOUD ROUTER PLATFORM FOR SDN NETWORKS

(71) Applicant: AT&T Intellectual Property I, L.P., Atlanta, GA (US)

(72) Inventors: Gur Rotkop, Warwickshire (GB); Prasanna Ramachandran, Morganville, NJ (US)

(73) Assignees: AT&T INTELLECTUAL PROPERTY I, L.P., Atlanta, GA (US); AT&T GLOBAL NETWORK SERVICES (UK) B.V., Redditch (GB)

( * ) Notice: Subject to any disclaimer, the term of this patent is extended or adjusted under 35 U.S.C. 154(b) by 310 days.

(21) Appl. No.: 16/867,908

(22) Filed: May 6, 2020

(65) Prior Publication Data
US 2021/0352108 A1 Nov. 11, 2021

(51) Int. Cl.
*H04L 9/40* (2022.01)
*H04L 47/10* (2022.01)
*H04L 45/50* (2022.01)
*H04L 45/00* (2022.01)
*H04L 45/64* (2022.01)

(52) U.S. Cl.
CPC .............. *H04L 63/20* (2013.01); *H04L 45/50* (2013.01); *H04L 45/54* (2013.01); *H04L 45/64* (2013.01); *H04L 47/10* (2013.01); *H04L 63/101* (2013.01)

(58) Field of Classification Search
None
See application file for complete search history.

(56) References Cited

U.S. PATENT DOCUMENTS 8,842,578 B1 * 9/2014 Zisapel .................. H04L 43/20
370/255
2017/0187607 A1 * 6/2017 Shaikh ................ H04L 41/0893

* cited by examiner

*Primary Examiner* — Xavier S Wong
(74) *Attorney, Agent, or Firm* — Guntin & Gust, PLC; Ralph Trementozzi (57) ABSTRACT

A system is described whereby a cloud router may allow routing as a service in a cloud-like manner. In an example, an apparatus may include a processor and a memory coupled with the processor that effectuates operations. The operations may include receiving first routing information associated with a first customer edge device; adding the first routing information to network routing information of the apparatus, wherein the network routing information comprises a network routing table with routes for a plurality of networks; and propagating the network routing information to a software defined network (SDN) controller, wherein, based on the network routing information, the SDN controller sends a forwarding information base (FIB) to a provider edge device connected with the first customer edge device.

20 Claims, 6 Drawing Sheets

CLOUD ROUTER PLATFORM FOR SDN NETWORKS

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs) to be instantiated. In turn, VMs may require various resources, such as memory, central processing units (CPUs), and network interfaces or network interface cards (NICs).

This background information is provided to reveal information believed by the applicant to be of possible relevance. No admission is necessarily intended, nor should be construed, that any of the preceding information constitutes prior art.

SUMMARY

A system is described whereby a cloud router may allow routing as a service in a cloud-like manner. In an example, an apparatus may include a processor and a memory coupled with the processor that effectuates operations. The operations may include receiving first routing information associated with a first customer edge device; adding the first routing information to network routing information of the apparatus, wherein the network routing information comprises a network routing table with routes for a plurality of networks; and propagating the network routing information to a software defined network (SDN) controller, wherein, based on the network routing information, the SDN controller sends a forwarding information base (FIB) to a provider edge device connected with the first customer edge device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
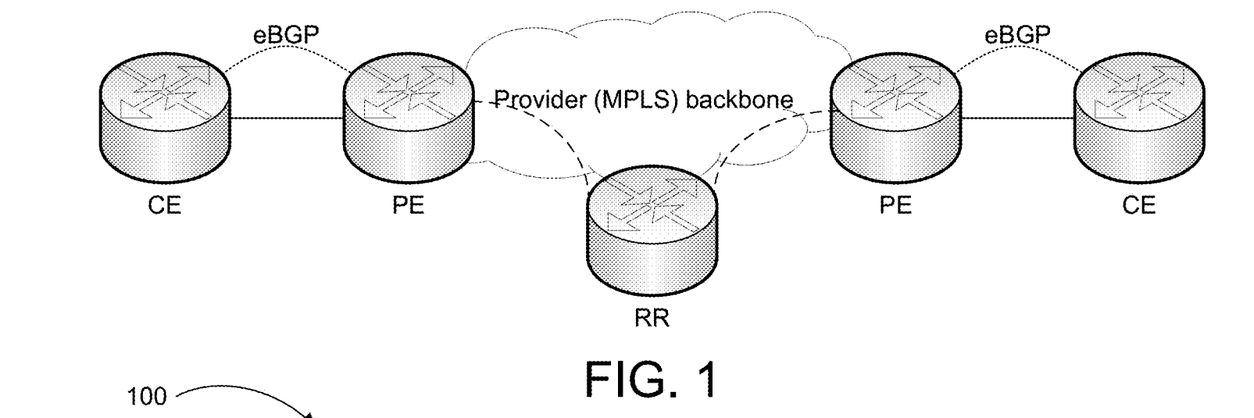
FIG. 1 illustrates an exemplary routing system with route reflectors.

The conventional implementation of layer 3 (L3) networks (e.g., physical or virtual) still maintain a legacy-style of routing information exchange at PE devices. Conventional routing exchange between a specific PE and a given CE may happen over nailed up border gateway protocol (BGP) sessions. Even with the conventional PE router being virtualized (vPE) and moved into the cloud, this session cannot be dynamically moved to other PE routers, without a session flap or route convergence that causes outages that may last ten minutes or longer. The conventional work around for the long outages are costly deployments of L3 devices in a dual homed redundant configuration. The conventional solution may prevent the adoption of cloud-scaling concepts, such as dynamically growing or shrinking of vNFs while maintaining active sessions. Further, in the conventional architecture as shown in FIG. 1, the PE to route reflector (RR) sessions may require the full download and processing of BGP routes which may cause sluggish performance in underpowered legacy PEs, especially those that cannot support route target constraints which may reduce the routing exchange into a targeted subset.

As disclosed herein, a cloud router may allow routing as a service in a cloud-like manner. A cloud router platform for SDN networks may overcome the need to deploy L3 devices at the edge of the network, allowing, at times, less expensive deployment than some conventional configurations and scaling without requiring significant changes to a CE. The disclosed cloud router platform for SDN networks may incorporate a remote BGP speaker to the CE devices, with the ability to grow and shrink on demand with no or minimal interruption of active sessions.

Figure 2:
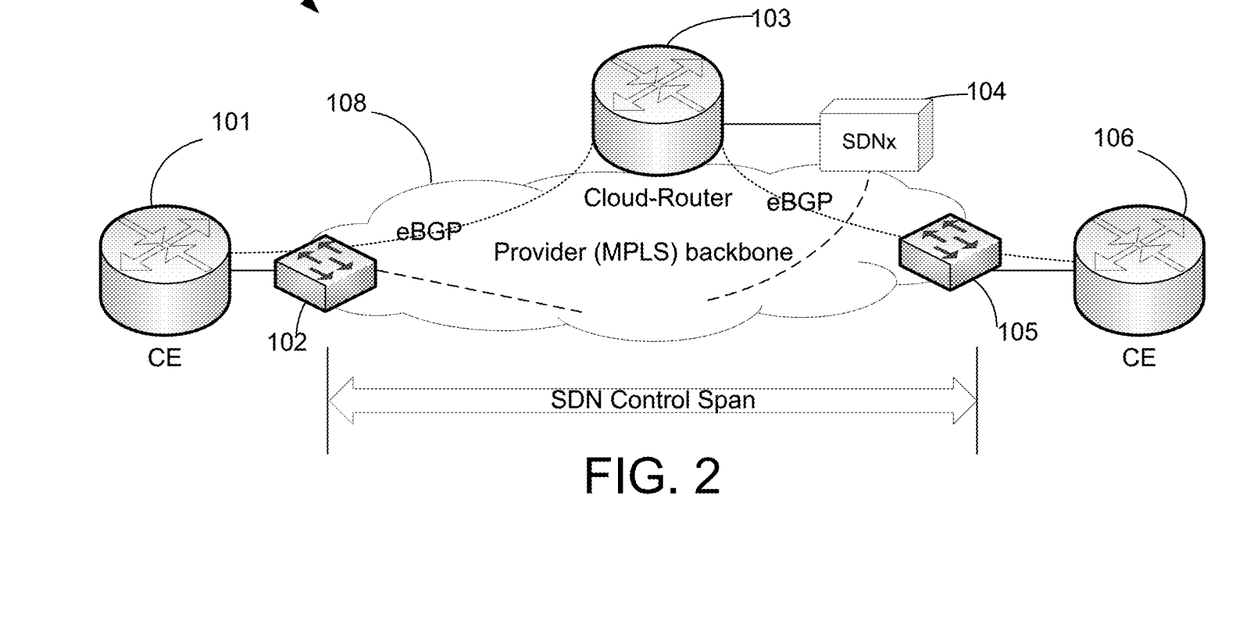
FIG. 2 illustrates an exemplary system that may implement a cloud router platform for SDN networks.

FIG. 2 illustrates an exemplary system 100 that may implement a cloud router platform for SDN networks, as disclosed herein. System 100 may include devices, such as customer edge 101, provider edge (PE) 102, cloud router 103, SDN controller 104, PE 105, and PE 106. The devices of system 100 may be communicatively connected with each other and network 108 (e.g., a cloud network). The devices of system 100 may be virtualized. The devices of system 100 may include routers, switches, access points, domain name servers, firewalls, mobile devices, or the like. Mobile devices may include a laptop, tablet, autonomous vehicle (e.g., SAE Intl level 3 to level 5 automation), or mobile phone, among other things. The functions of the devices of system 100 may be on one device or distributed over multiple devices. As shown in FIG. 2, cloud router 103 may interface with SDN controller 104. SDN controller 104 may program the backbone paths accordingly using a mechanism such as Openflow. This may allow for deployment of much simpler devices, such as PE 102 or PE 105, without requiring changes to the customer access.

Figure 3:
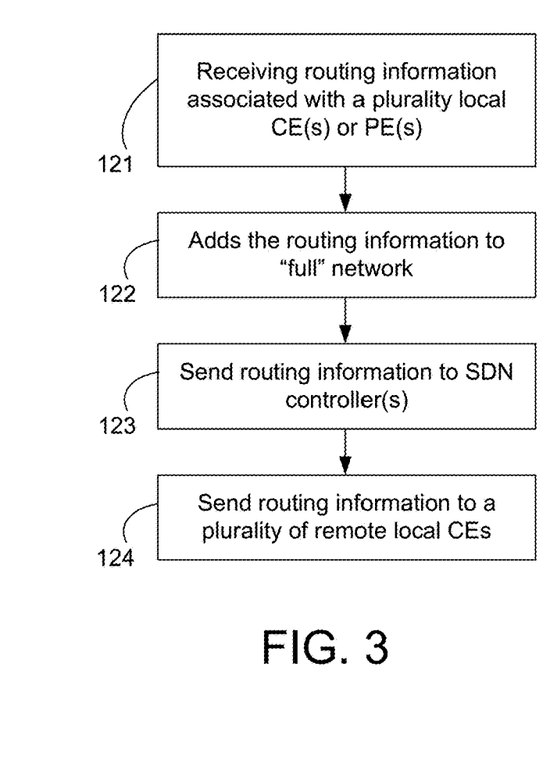
FIG. 3 illustrates an exemplary method for a cloud router platform for SDN networks.

FIG. 3 illustrates an exemplary method for a cloud router platform for SDN networks. At step 121, cloud router 103 may receive routing information associated with one or more local CEs or PEs, such as CE 101, CE 106, PE 102, or PE 105. PEs, such as PE 102, may not process routing information, but act as a conduit to forward control packets to cloud outer 103. Control packets may include attributes (e.g., communities) or session admin operation (e.g., BGP states). PE 102 may not hold a routing table and may use a forward information base (FIB) (or label forwarding instance base—LFIB) that is directly programmed with required routes only by SDN controller 104. Required routes may be considered those which PE 102 holds in its forwarding table for local customers connections. Conventionally most of the routes received by a PE are not required (e.g., only 10 customers are provisioned on that PE. If the routing download contains information on 100 unique customers, 90 of them are deleted.). At step 122, cloud router 103 may add the routing information to a network table, in which the network table is for devices connected with network 108. At step 123, cloud router 103 may propagate the routing information to SDN controller 104. (See FIG. 4). At step 124, cloud router 103 may propagate the routing information to a plurality of remote local CEs (e.g., CE 106 or CE 101). CE 101 may peer via BGP with cloud router 103, receiving routing information from cloud router 103. The session may not be tied on the provider edge side to a specific virtual machine (VM), but rather can be moved between different termination points when there is a need to grow or shrink routing information found within cloud router 103. The session may be the TCP session established by BGP. This session may be tied to a single fixed endpoint be it a VM running a virtual router or a physical router. The growing and shrinking here may refer to a group of VMs (or any other virtualization technology) that as a group create the cloud router, to increase capacity additional VMs/containers can be created, and removed to reduce capacity. Since cloud router 103 may be a high-end server with superior control plane processing and no requirement to handle a data forwarding plane, cloud router 103 may maintain about 4,000 or higher number of eBGP sessions. Cloud router 103 may be deployed in a geo-redundant fashion. Core devices may forward based on reduced FIB or LFIB. Core devices may include provider routers, there may not be a change to these.

With continued reference to FIG. 3, cloud router 103 may hold a unified Routing Information Base (RIB) for all clients. For further context, unified may mean for all clients, as oppose to PEs which may only hold information for directly connected clients. The cloud router communicates with an SDN controller, which programmatically converts the RIB into a Forwarding Information Base (FIB). Subsequently the controller can then program the FIB states accordingly, in the edges via a mechanism such as Openflow allowing traffic propagation. For further perspective, a forwarding information base (FIB) is the actual information that a routing device or switching device uses to choose the interface that a given packet will use for egress. For example, the FIB may be programmed such that a packet bound to a destination in 192.168.1.0/24 should be sent out of physical port ethernet1/2. There may actually be multiple FIB's on a device for unicast forwarding and different protocols (e.g., IPv4, MPLS, IPv6) but the basic function is usually the same, which may include selection criteria (usually destination) mapping to an output interface or encapsulation. Individual FIB's may also be partitioned to achieve concurrent independent forwarding tables (e.g., virtual routing and forwarding—VRFs). Each FIB is programmed by one or more routing information bases (RIB). The RIB is a selection of routing information learned via static definition or a dynamic routing protocol. The algorithms used within various RIB's will vary—so, for example, the means by which BGP or OSPF determines potential best paths vary quite a bit. The means by which multiple RIB's are programmed into a common (set) of FIB's in a box will vary by implementation but this is where concepts like administrative distance are used (e.g. identical paths are learned via eBGP and OSPF, the eBGP is usually preferred for FIB injection). Again, RIB's may also be potentially partitioned to allow for multiple VRFs, etc.

Figure 4:
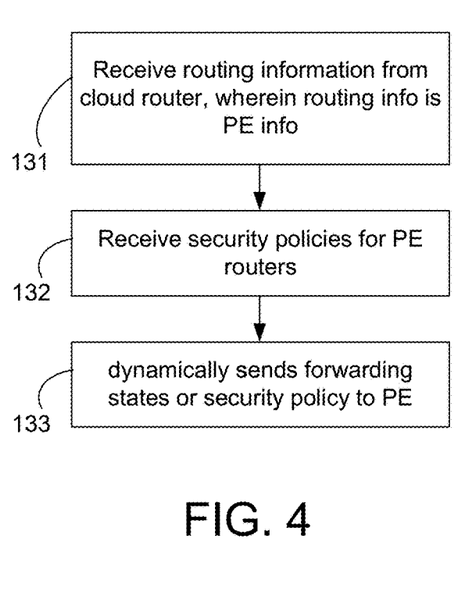
FIG. 4 illustrates an exemplary method for a cloud router platform for SDN networks.

FIG. 4 illustrates an exemplary method for a cloud router platform for SDN networks. At step 131, SDN controller may receive routing information associated with one or more local CEs or PEs from cloud router 103. At step 132, SDN controller 104 may receive security policies for PEs, such as PE 102. An example security policy is which IP ranges are allowed to be processed by PE 102 itself (e.g., to the PE rather than through the PE 102). At step 133, SDN controller 104 may dynamically send forwarding information and security policies to PE 102. The addition of new routes based on an interface coming online, an interface being removed, or other routing updates may trigger the dynamic forwarding of information or security policies. The security policy may be to block or rate-limit unnecessary traffic. The security policy may help restrict illegitimate traffic and traffic to CPU of PE 102 may be throttled per the security policy. Conventionally, the blocking of malicious traffic and infrastructure protection is enforced by access lists that get configured by command line by network operators or operation support systems (OSS). Here, SDN controller 104 or cloud router 103 may communicate and implement a global and site-specific security policy that is derived from actual routing. The security policies may be dynamically signaled by cloud router 103 and the forwarding on PE 102 may be programmed by SDN controller 104 to block such traffic. As further described, the security polices may block or throttling mechanism (e.g., access control lists, etc.) that may be configured by SDN controller 104 to PE 102. SDN controller 104 may communicate with the PE 102 and policies can rely on actual routing information which is known by cloud router 103.

Figure 5:
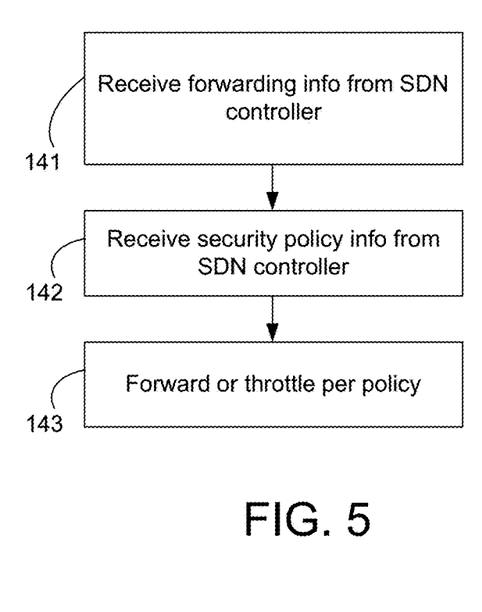
FIG. 5 illustrates an exemplary method for a cloud router platform for SDN networks.

FIG. 5 illustrates an exemplary method for a cloud router platform for SDN networks. At step 141, PE 102, for example, may receive forwarding information from SDN controller 104. At step 142, PE 102 may receive a security policy from SDN controller 104. At step 143, based on forwarding information or security policy, forwarding packets per the forwarding information or throttling packets per the throttling per policy.

Figure 6:
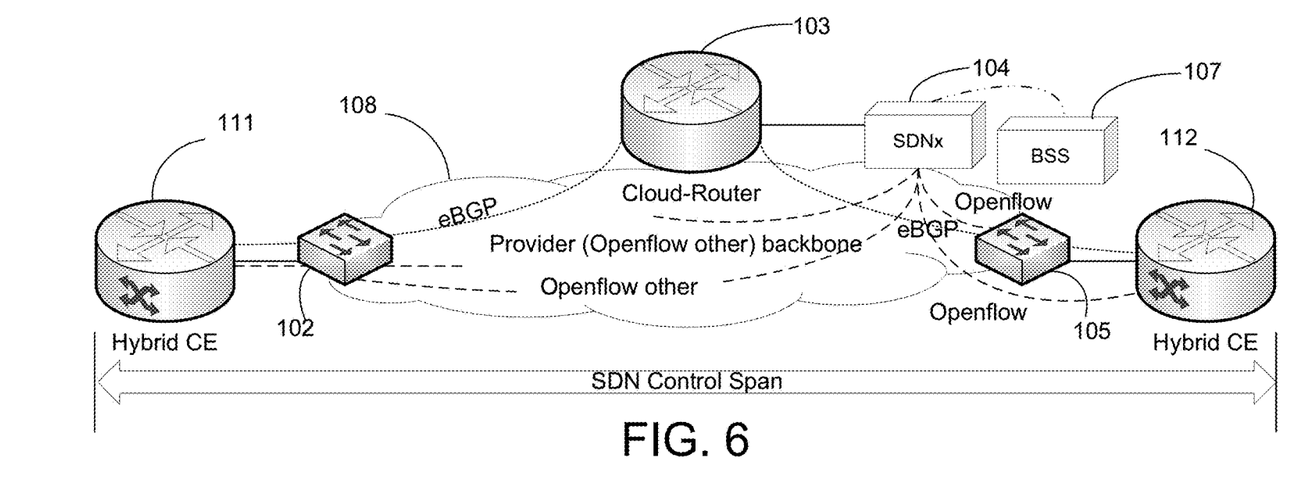
FIG. 6 illustrates an exemplary system that may implement a cloud router platform for SDN networks.

FIG. 6 illustrates an exemplary system that may implement a cloud router platform for SDN networks. As shown in FIG. 6, SDN demarcation can expand to a hybrid CE device (e.g., hybrid CE 111 or hybrid CE 112), which makes the CE include PE functionality. This enables an end to end SDN scenario where hybrid CE 112 include MPLS PE. This configuration may simplify service provider operations. Security policies can be configured via a business support system (BSS) 107-SDN controller 104 interface to ensure the VPN demarcation is preserved. For example, only send FIB entries of hybrid CE 111 to hybrid prem devices installed at that location. FIB entries for the site of hybrid CE 112 (e.g., a first customer) may be blocked from propagating to the site of hybrid CE 111 (e.g., a second customer).

Figure 7:
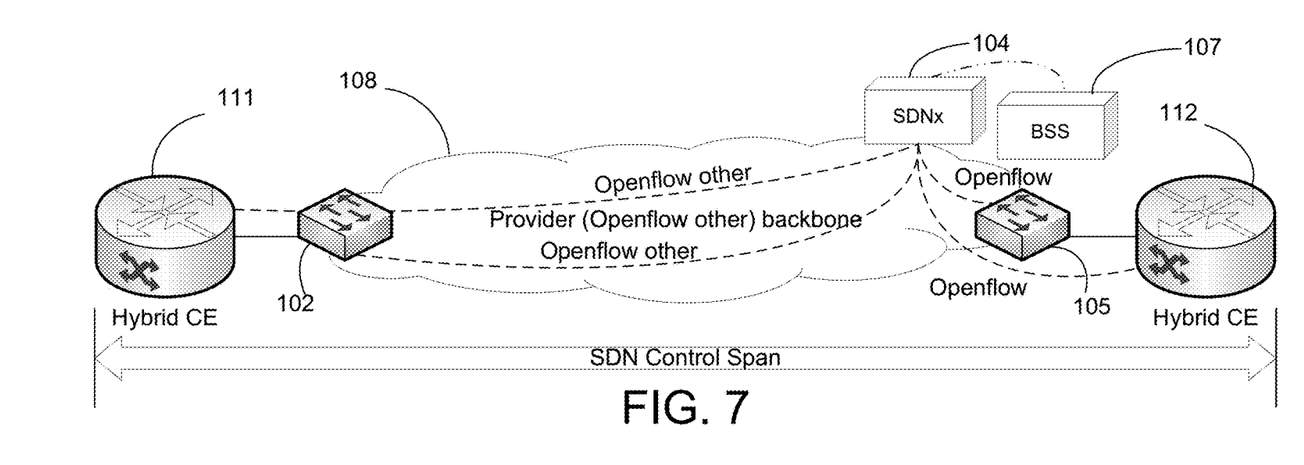
FIG. 7 illustrates an exemplary system that may implement a cloud router platform for SDN networks.

FIG. 7 illustrates an exemplary system that may implement a cloud router platform for SDN networks. As shown in FIG. 7, it is possible to further leverage the SDN paradigm to eliminate BGP on the hybrid CE and obtain a programmatic interface via Openflow or other mechanism with SDN controller 104 sitting in the service provider infrastructure for signaling and setting up layer 2 (L2) VPNs between CE devices. This allows the end customer to essentially obtain a local area network (LAN) implementation with multiple sites situated across a wide area network (WAN). Note that OpenFlow is a communications protocol that gives access to the forwarding plane of a network switch or router over the network.

The disclosed cloud router platform for SDN networks may allow for established BGP sessions during edge device scale-up, scale-down operations, as well as during maintenance of an individual VM. Further, PEs may only receive the necessary forwarding info for its directly connected clients, rather than the full BGP table (which is the current norm). This may allow for reduced memory and processing requirements in view of the conventional mode of operation is for the PE to receive and process full BGP table route table and dispose of 90% of information which is not needed. A substantially targeted forwarding-only table programming by an SDN controller may reduce the time needed for an initial boot time and recovery scenarios since they do not require a full table refresh.

Figure 8:
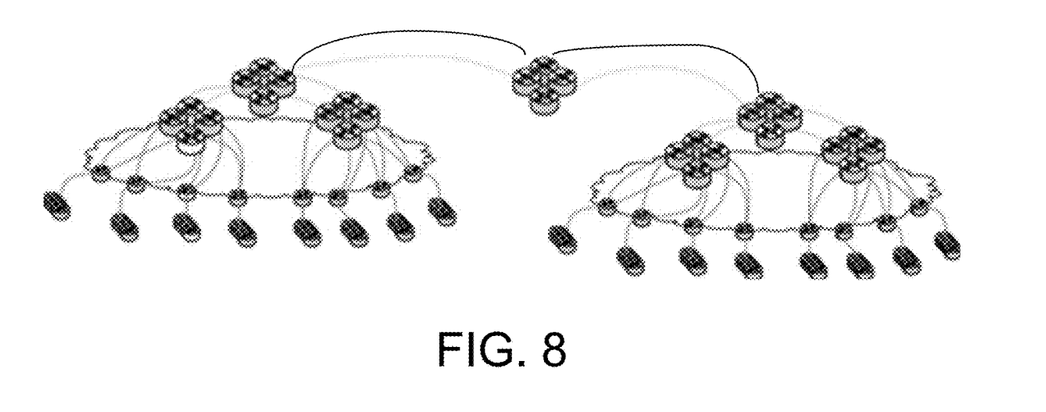
FIG. 8 illustrates an exemplary routing system with route reflectors.
Figure 9:
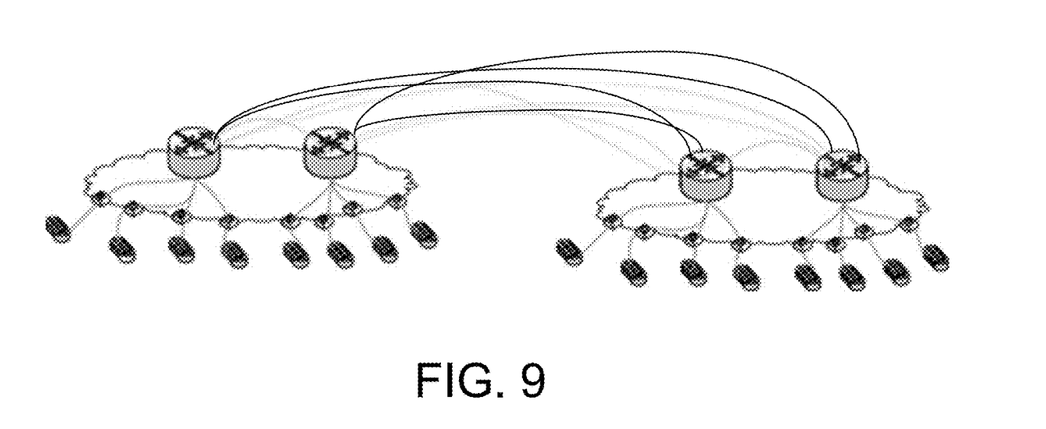
FIG. 9 illustrates a topology with the disclosed cloud router platform.

Conventionally, there is a hierarchical route reflector design with the intra-autonomoussystem (AS) RRs talking to inter-AS or inter-service RRs. Due to the higher scale and simplified operation for the cloud router platform for SDN networks, cloud router 103 may be connected in a flat topology with other inter-AS cloud RRs. FIG. 8 illustrates a topology with RRs, while FIG. 9 illustrates a topology with the disclosed cloud router platform. The disclosed cloud router platform for SDN networks may simplify the network architectures so that Whitebox based products may more easily be used in network infrastructure because of reduced load or need for processing power. Further, with the cloud router platform for SDN networks a L2 virtual private network (VPN) technology may be implemented on the PEs via the forwarding information programmed through SDN controller 104 to maintain the VPN distinction and prevent a first customer network traffic bleeding into the ports of a second customer network traffic.

Figure 10:
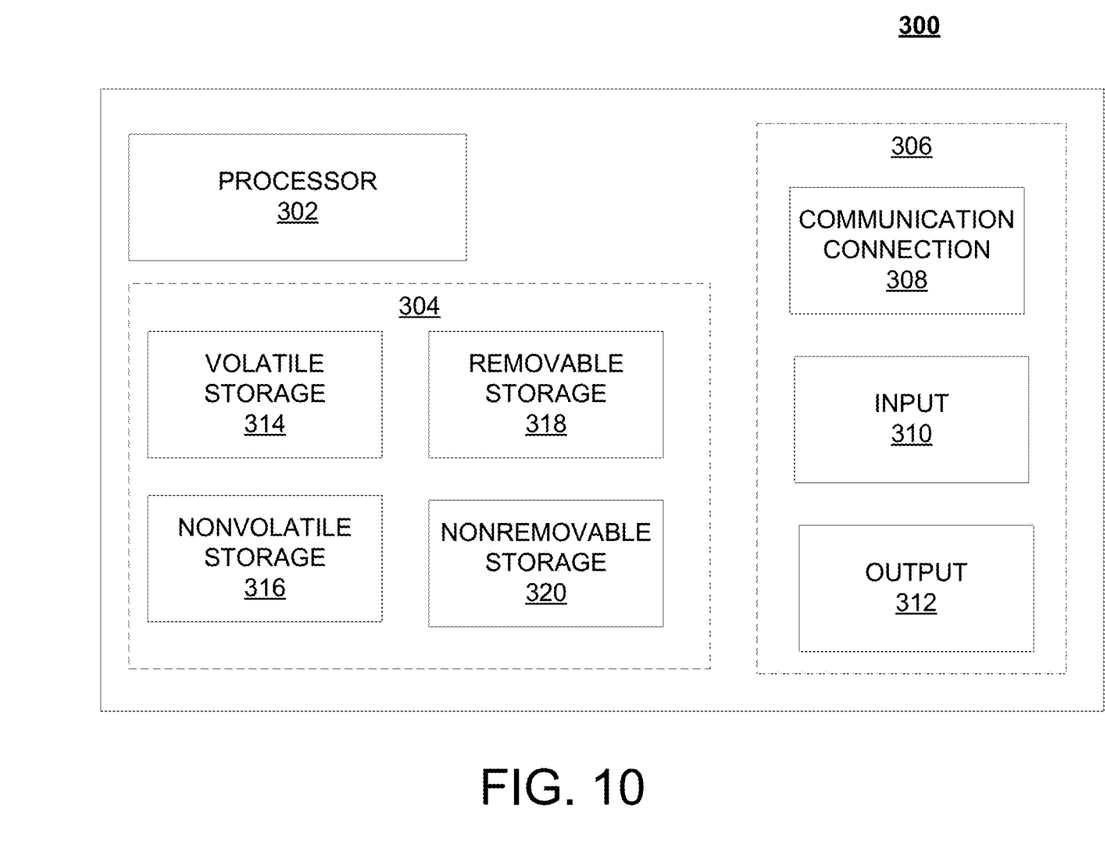
FIG. 10 illustrates a schematic of an exemplary network device.

FIG. 10 is a block diagram of network device 300 that may be connected to or comprise a component of a network in FIG. 1-FIG. 9. Network device 300 may comprise hardware or a combination of hardware and software. The functionality to facilitate telecommunications via a telecommunications network may reside in one or combination of network devices 300. Network device 300 depicted in FIG. 10 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 10 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 10) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 11:
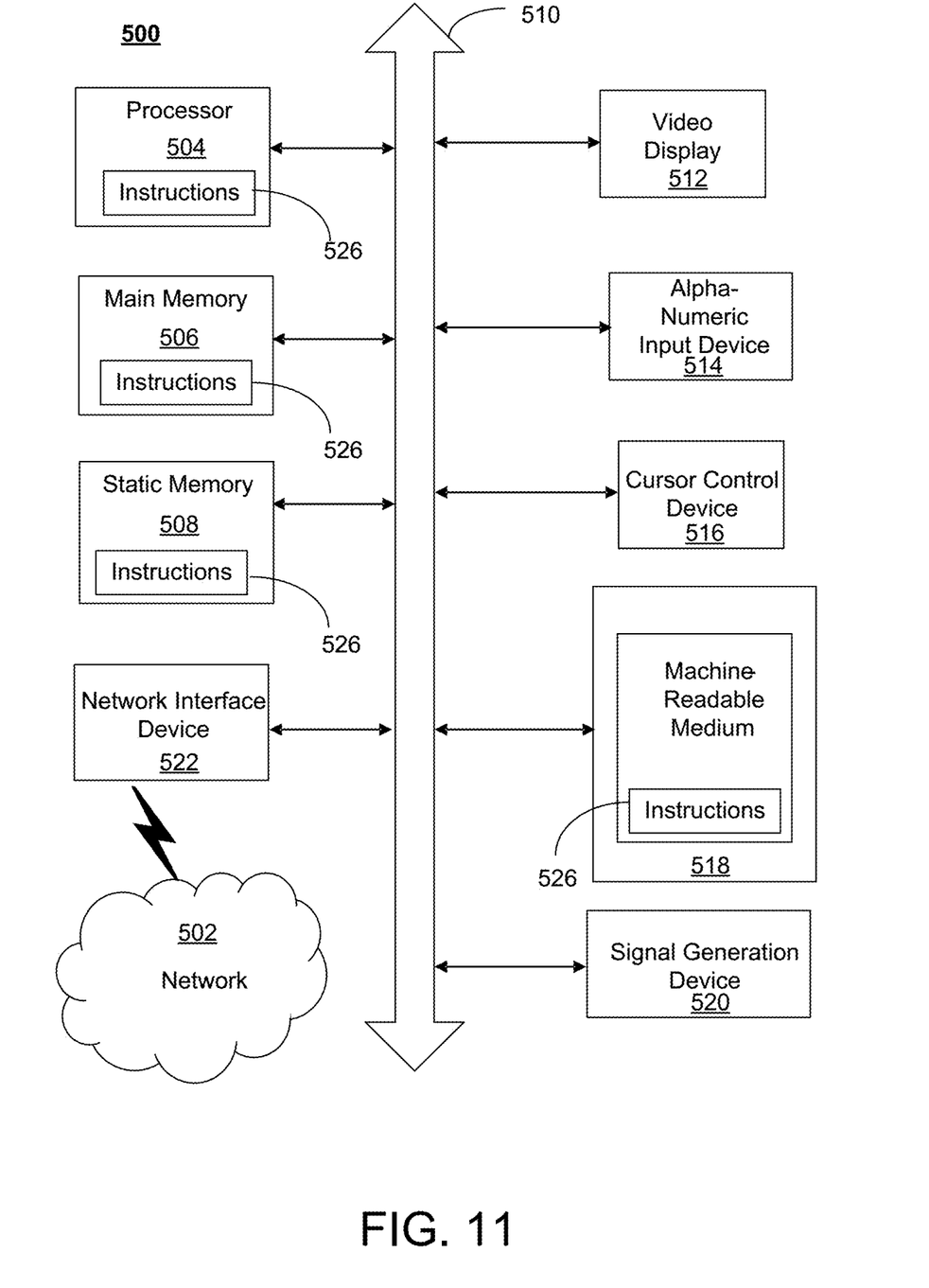
FIG. 11 illustrates an exemplary communication system that provides wireless telecommunication services over wireless communication networks.

FIG. 11 depicts an exemplary diagrammatic representation of a machine in the form of a computer system 500 within which a set of instructions, when executed, may cause the machine to perform any one or more of the methods described above. One or more instances of the machine can operate, for example, as processor 302, CE 101, PE 102, cloud router 103, SDN controller 104, PE 105, CE 106, and other devices of FIG. 1-FIG. 9. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which alerts for the cloud router platform can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—cloud router platform for SDN networks—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for a cloud router platform for SDN. A method, system, computer readable storage medium, or apparatus provides for receiving first routing information associated with a first customer edge device; adding the first routing information to network routing information of the apparatus, wherein the network routing information comprises a network routing table with routes for a plurality of networks; and propagating the network routing information to a software defined network (SDN) controller, wherein, based on the network routing information, the SDN controller sends a forwarding information base (FIB) to a provider edge device connected with the first customer edge device. The method, system, computer readable storage medium, or apparatus provides for propagating the network routing information to a plurality of customer edge devices. The plurality of customer edge devices may include the first customer edge device. The network routing information may be a unified routing information base (RIB) for the plurality of customer edge devices. The network routing information may include a security policy. The security policy may be based on information from a business support system (BSS). The security policy may include an access control list or instructions for throttling traffic to the first customer edge device. All combinations in this paragraph (including the removal or addition of steps) are contemplated in a manner that is consistent with the other portions of the detailed description.

What is claimed:

1. An apparatus comprising:
a processing system including a processor; and
a memory coupled with the processing system, the memory storing executable instructions that when executed by the processing system cause the processing system to effectuate operations comprising:
receiving first routing information associated with a first customer edge device;
adding the first routing information to network routing information of the apparatus, wherein the network routing information comprises a network routing table with routes for a plurality of networks, the routes including a backbone path; and
propagating the network routing information to a software defined network (SDN) controller, wherein, based on the network routing information, the SDN controller sends a forwarding information base (FIB) to a provider edge device connected with the first customer edge device, and wherein the backbone path facilitates a replacement of the provider edge device without requiring a change to the first customer edge device.

2. The apparatus of claim 1, the operations further comprising propagating the network routing information to a plurality of customer edge devices, wherein the plurality of customer edge devices comprise the first customer edge device.

3. The apparatus of claim 1, the operations further comprising propagating the network routing information to a plurality of customer edge devices, wherein the plurality of customer edge devices comprise the first customer edge device, wherein the network routing information is a unified routing information base (RIB) for the plurality of customer edge devices.

4. The apparatus of claim 1, wherein the network routing information comprises a security policy.

5. The apparatus of claim 1, wherein the network routing information comprises a security policy, wherein the security policy is based on information from a business support system (BSS).

6. The apparatus of claim 1, wherein the network routing information comprises a security policy, wherein the security policy comprises an access control list.

7. The apparatus of claim 1, wherein the network routing information comprises a security policy, wherein the security policy comprises instructions for throttling traffic to the first customer edge device.

8. A method comprising:
receiving, by a processing system including a processor, first routing information associated with a first customer edge device;
adding, by the processing system, the first routing information to network routing information of the processing system, wherein the network routing information comprises a network routing table with routes for a plurality of networks, the routes including a backbone path; and
propagating, by the processing system, the network routing information to a software defined network (SDN) controller, wherein, based on the network routing information, the SDN controller sends a forwarding information base (FIB) to a provider edge device connected with the first customer edge device, and wherein the backbone path facilitates a replacement of the provider edge device without requiring a change to the first customer edge device.

9. The method of claim 8, further comprising propagating, by the processing system, the network routing information to a plurality of customer edge devices, wherein the plurality of customer edge devices comprise the first customer edge device.

10. The method of claim 8, further comprising propagating, by the processing system, the network routing information to a plurality of customer edge devices, wherein the plurality of customer edge devices comprise the first customer edge device, wherein the network routing information is a unified routing information base (RIB) for the plurality of customer edge devices.

11. The method of claim 8, wherein the network routing information comprises a security policy.

12. The method of claim 8, wherein the network routing information comprises a security policy, wherein the security policy is based on information from a business support system (BSS).

13. The method of claim 8, wherein the network routing information comprises a security policy, wherein the security policy comprises an access control list.

14. The method of claim 8, wherein the network routing information comprises a security policy, wherein the security policy comprises instructions for throttling traffic to the first customer edge device.

15. A system comprising:
a processing system including a processor; and
memory coupled with the processing system, the memory storing executable instructions that when executed by the processing system cause the processing system to effectuate operations comprising:
receiving first routing information associated with a first customer edge device;
adding the first routing information to network routing information of the system,
wherein the network routing information comprises a network routing table with routes for a plurality of networks, the routes including a backbone path; and
based on the network routing information, sending a forwarding information base (FIB) to a provider edge device connected with the first customer edge device, and
wherein the backbone path facilitates a replacement of the provider edge device without requiring a change to the first customer edge device.

16. The system of claim 15, the operations further comprising propagating the network routing information to a plurality of customer edge devices, wherein the plurality of customer edge devices comprise the first customer edge device.

17. The system of claim 15, the operations further comprising propagating the network routing information to a plurality of customer edge devices, wherein the plurality of customer edge devices comprise the first customer edge device, wherein the network routing information is a unified routing information base (RIB) for the plurality of customer edge devices.

18. The system of claim 15, wherein the network routing information comprises a security policy, wherein the security policy is based on information from a business support system (BSS).

19. The system of claim 15, wherein the network routing information comprises a security policy, wherein the security policy comprises an access control list.

20. The system of claim 15, wherein the network routing information comprises a security policy, wherein the security policy comprises instructions for throttling traffic to the first customer edge device.

* * * * *